United States Patent [19]

Arndt et al.

[11] 3,835,172

[45] Sept. 10, 1974

[54] PROCESS FOR THE MANUFACTURE OF AROMATIC ISOCYANATES USING OXYETHYLATE CATALYSTS

[75] Inventors: Otto Arndt, Hofheim/Taunus; Gunther Semler, Kelkheim/Taunus; Georg Schaeffer, Frankfurt/Main, all of Germany

[73] Assignee: Farbwerke Hoechst Aktiengesellschaft vormals Meister Lucius & Bruning, Frankfurt/Main, Germany

[22] Filed: Jan. 12, 1972

[21] Appl. No.: 217,384

Related U.S. Application Data

[63] Continuation-in-part of Ser. No. 842,351, July 16, 1969, abandoned.

[30] Foreign Application Priority Data

July 25, 1968 Germany............................ 1793021

[52] U.S. Cl. ......................................... 260/453 PH
[51] Int. Cl. ........................................ C07c 119/04
[58] Field of Search............................ 260/453 PH

[56] References Cited
UNITED STATES PATENTS

| | | | |
|---|---|---|---|
| 2,875,226 | 2/1959 | Bloom et al. | 260/453 |
| 2,884,362 | 4/1959 | Bloom et al. | 260/453 X |
| 2,999,873 | 9/1961 | Bloom et al. | 260/453 |

*Primary Examiner*—Lewis Gotts
*Assistant Examiner*—Dolph H. Torrence
*Attorney, Agent, or Firm*—Curtis, Morris & Safford

[57] ABSTRACT

Improved process for the preparation of aromatic isocyanates by reaction of phosgene with primary aromatic amines or their salts in a suspension in an inert solvent, in which the reaction is carried out in the presence of catalytic amounts of a compound containing at least 6 polyethylene oxide groups in one chain. By the addition of said compound the required amount of phosgene is reduced, the reaction proceeds faster and the isocyanates are obtained in higher yields.

11 Claims, No Drawings

PROCESS FOR THE MANUFACTURE OF AROMATIC ISOCYANATES USING OXYETHYLATE CATALYSTS

This is a continuation-in-part of our copending application Ser. No. 842,351, filed July 16, 1969, now abandoned.

The present invention relates to an improved process for the manufacture of aromatic isocyanates.

According to a known process for the manufacture of organic isocyanates primary amines are reacted with phosgene at relatively low temperatures in the presence of inert solvents (cold phosgenation) and the reaction is finalized at a higher temperature (hot phosgenation). In a modified version of that process amine salts instead of the free amines are converted into isocyanates by hot phosgenation corresponding to the later stages of the process described above.

The solvents used for the reaction mentioned above are advantageously those whose boiling points are higher than the decomposition points of the initially formed carbamic acid chlorides and in which hydrogen chloride is only very sparingly soluble. In such weakly polar to non-polar solvents, for example benzene and its chloro-substitution products, the hydrochlorides of numerous industrially important amines are sparingly soluble and thus the stirring of the suspension is difficult and time-consuming.

It is known from U.S. Pat. Nos. 2,875,226 and 2,999,873 to prepare isocyanates from an amine and phosgene in an inert solvent at a temperature of 100° to 200°C, which inert solvent is at least partially a di-ether of a mono-, di- or trialkylene glycol. Said ether is used in an about 1 to 10-fold amount, referred to the weight of the amine. Due to the relatively high volatility a fractional distillation is necessary to separate the ether from the product and the further inert solvent.

Furthermore, said diethers are rather expensive and not easily accessible. It is not possible to replace these diethers by the corresponding monoethers since the free hydroxy groups of such mono-, di or trialkylene glycol monoethers are capable of reacting with either the phosgene and the isocyanate which reactions lower the yields considerably. When using such products in catalytic amounts no improvement in the phosgenation reaction is found.

Surprisingly, we now have found that the preparation of aromatic isocyanates of the benzene series by reacting phosgene with the corresponding amine or amine salt in a suspension in an inert solvent proceeds more rapidly and substantially less phosgene is consumed when the reaction is carried out in the presence of about 0.1 to about 10 percent by weight, based on the amount of amine or amine salt, of a reaction product of ethylene oxide with an hydrogen-active compound selected from the group consisting of water; saturated or mono-olefinically unsaturated straight-chain or branched aliphatic mono- to hexahydric alcohol of up to 18 carbon atoms; mono- to hexahydric, cyclohexyl alcohol; mono- to trihydric phenol which is unsubstituted or substituted by 1 to 3 identical or different residues selected from the group consisting of alkyl of 1 to 10 carbon atoms, chlorine and lower alkoxy; ammonia; primary or secondary saturated or mono-olefinically unsaturated straight-chain or branched aliphatic amine of up to 18 carbon atoms in each aliphatic group; and alkane or alkene carboxylic acid of up to 18 carbon atoms each, which reaction product contains at least 6 ethylene oxide units in each polyethylene oxide group and at least one free terminal hydroxy group in said polyethylene oxide chains.

Furthermore, the addition of said reaction products of ethylene oxide, which in the following are called oxethylates, gives a distinctly better yield, under otherwise comparable test conditions. In this connection it is immaterial whether these substances are added to the solutions of the amines or of phosgene prior to the cold phosgenation or are added to the cold phosgenation mixture or to the hydrochloride suspension before the hot phosgenation.

It is another advantage of the process of the present invention that by the addition of the oxethylates the viscosity of the reaction mixture is reduced so that a saving in solvent or in work at higher concentrations is possible.

The oxethylates are used advantageously in an amount of from 0.1 to 10 percent by weight referred to the amine or amine salt. In general, best results are achieved by using 0.5 to 5 percent by weight of oxethylate.

The addition of oxethylates according to the present invention can be made in all known phosgenation processes in which sparingly soluble amine hydrochloride is present in the reaction medium during the phosgenation. The conditions under which the present process is performed are those conventionally used in the manufacture of isocyanates from phosgene and amines in the liquid phase.

Specially suitable oxethylates are those of water, of a mono- to tetrahydric saturated or mono-ethylenically unsaturated straight chain or branched aliphatic alcohol of up to 18 carbon atoms each, preferably an alkanol or alkenol or alkanediol of up to 18 carbon atoms each, glycerol or pentaerythritol; a mono- or dihydric cyclohexyl alcohol, preferably cyclohexanol; a monohydric phenol which is unsubstituted or substituted by 1 to 3 identical or different residues selected from alkyl of 1 to 10 carbon atoms and lower alkoxy, especially phenol, nonylphenol or tributylphenol; ammonia; a primary or secondary saturated or mono-olefinically unsaturated straight-chain or branched aliphatic amine of up to 18 carbon atoms in each aliphatic group, especially a primary alkyl or alkenyl amine of up to 18 carbon atoms each; or an alkane or alkene carboxylic acid of up to 18 carbon atoms. Those substances are preferred which have a much higher boiling point than the isocyanates to be manufactured and which remain in the residues when the latter are subjected to distillative working up.

Suitable compounds of this kind are, for example:

Polyethyleneglycol of average molecular weight 300, polyethyleneglycol of average molecular weight 20,000, the reaction product of 1 mol of methanol with 8 mols of ethylene oxide, the reaction product of 1 mol of oleyl alcohol with 50 mols of ethylene oxide, the reaction product of 1 mol of stearyl alcohol with 150 mols of ethylene oxide, the reaction product of 1 mol of octadecanediol with 95 mols of ethylene oxide, the reaction product of 1 mol of nonylphenol with 6 mols of ethylene oxide, the reaction product of 1 mol of nonylphenol with 30 mols of ethylene oxide, the reaction product of 1 mol of tributylphenol with 13 mols of ethylene oxide, the reaction product of 1 mol of stearic acid with 75 mols of ethylene oxide, the reaction product of 1 mol of oleylamine with 25 mols of ethylene oxide, the reaction product of 1 mol of triethanolamine with 30 mols of ethylene oxide, polyethyleneglycol of average molecular weight of 2000, polyethyleneglycol of average molecular weight 5000, the reaction product of 1 mol of glycerol with 60 mols of ethylene oxide, the reaction product of 1 mol of pentaerithritol with 80 or 250 mols of ethylene oxide.

The process can be carried out batchwise or continuously within a wide temperature range.

There are generally all aromatic primary amines capable of being transformed into the corresponding isocyanates according to the following equation:

Ar-NH$_2$ + COCl$_2$   Ar-N=C=O + 2 HCl in which Ar represents an aromatic radical. Preferred are amines of the formula

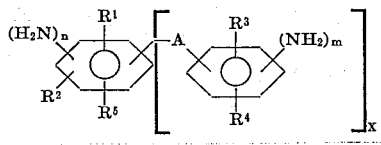

in which $R^1$, $R^2$, $R^3$ and $R^4$ are hydrogen, halogen, especially chlorine or bromine; lower alkyl, especially methyl; lower alkoxy, especially methoxy; trifluoromethyl or nitro; $R^5$ is chlorine, methyl or, preferably, hydrogen, A is a direct bond, oxygen or methylene, $n$ is 1 or 2, $m$ is zero or 1 and $x$ is zero or 1.

Especially preferred are amines of the formula

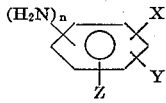

in which X is hydrogen, chlorine, methyl, trifluoromethyl, nitro- or chlorophenoxy, Y is hydrogen or chlorine, Z is chlorine, methyl or, preferably, hydrogen and $n$ is 1 or 2.

The following Examples illustrate the present invention but they are not intended to limit it thereto.

Parts in the following examples are by weight.

EXAMPLE 1

A mixture of 324.0parts of 3,4-dichloroaniline, 1620 parts of chlorobenzene and 3.80 parts of nonylphenol polyethylene oxide (containing 14 ethylene oxide units) was run through an immersion tube, without cooling, within 1 hour into a solution, cooled to about 5°C, of 400.0 parts of phosgene in 1620 parts of chlorobenzene. The resulting suspension was heated within 20 minutes to 70°C and kept at this temperature for 80 minutes, during which phosgene was injected at a rate of about 1.5 parts per minute. The solution which finally (at 70°C) had become clear was heated within 20 to 25 minutes to the reflux temperature to expel the hydrogen chloride and phosgene and to decompose the carbamic acid chloride and kept refluxing for 20 minutes. After by-products (biuret etc.) had been distilled off, a yield of 366 parts of 3,4-dichlorophenylisocyanate (= 97.4 percent of theory) was obtained.

When no nonylphenol polyethylene oxide was added, the resulting yield after 80 minutes at 70°C was only 340 parts of 3,4-dichlorophenylisocyanate (=90.5 percent of theory), after 180 minutes at 70°C it was 357 parts (= 95.0 percent of theory). Moreover, the cold phosgenation suspension was distinctly more viscid and more difficult to stir.

EXAMPLE 2

A mixture of 324.0 parts of 3,4-dichloroaniline, 1620 parts of chlorobenzene and 3.80 parts of nonylphenol polyethylene oxide (containing 14 ethylene oxide units) was run through an immersion tube, without cooling, within 1 hour into a solution, cooled to about 5°C, of 400 parts of phosgene and 1620 parts of chlorobenzene. The suspension was heated within 20 minutes to 70°C and kept for 30 minutes at this temperature, during which phosgene was injected at a rate of 1.5 parts per minute. The resulting thin suspension was heated within 20 to 25 minutes to the reflux temperature to expel the hydrogen chloride and phosgene and to decompose the carbamic acid chloride and then refluxed for 20 minutes. After distillation, a yield of 352 parts of 3,4-dichlorophenylisocyanate (= 93.6 percent of theory) was obtained.

When in the process described in Example 2 another oxethylate was used instead of the above-mentioned nonylphenol polyethylene oxide, the following results were obtained:

| Oxethylate added | yield of 3,4-dichlorophenylisocyanate | |
|---|---|---|
| | parts b. wt. | = % of theory |
| (a) Polyethylene oxide, mol. wt. 20,000 | 365 | 97.2 |
| (b) methanol with 8 ethylene oxide units | 364 | 96.8 |
| (c) stearyl alcohol with 150 ethylene oxide units | 369 | 98.0 |
| (d) oleyl alcohol with 50 ethylene oxide units | 365 | 97.2 |
| (e) octadecanediol with 95 ethyleneoxide units | 361 | 96.0 |
| (f) oleylamine with 25 ethylene oxide units | 361 | 96.0 |
| (g) triethanolamine with 30 ethylene oxide units | 366 | 97.4 |
| (h) pentaerithritol with 250 ethylene oxide units | 370 | 98.5 |
| (i) pentaerithritol with 80 ethylene oxide units | 363 | 96.5 |

When working under identical conditions, but without addition of polyethylene oxide, the yield was only 275 parts of 3,4-di-chlorophenylisocyanate (= 73.2 percent of theory). When adding the same amount of triethylene glycol or diethyleneglycol monomethyl ether only 258 parts by weight (68.5 percent of the theory) or 288 parts by weight (76.6 percent of the theory), respectively, were obtained. Moreover, the suspensions were still thickly liquid after 30 minutes at 70°C.

EXAMPLE 3

When the phosgenation of 3,4-dichloroaniline was carried out as described in Example 2(a), but with addition of 16 parts of polyethylene oxide of average molecular weight 20,000, the phosgenation was complete when only 30 parts of phosgene had been injected (clear solution). The yield amounted to 371 parts of 3,4-dichlorophenylisocyanate, corresponding to 98.7 percent of theory.

EXAMPLE 4

When the phosgenation was carried out according to Example 1, with the modification that nonylphenol polyethylene oxide was only added after preparation of the cold phosgenation suspension, the result achieved was the same (366 parts of 3,4-dichlorophenylisocyanate = 97.4 percent of theory).

EXAMPLE 5

When the phosgenation according to Example 2(a) was carried out with the modification that polyethylene oxide 20,000 was added to the phosgene solution before the amine was added thereto, there were obtained 361 parts of 3,4-dichlorophenylisocyanate (=96.0 percent of theory).

EXAMPLE 6

162 Parts of 3,4-dichloroaniline and 1.6 parts of polyethylene oxide (average molecular weight 20,000) were dissolved in 1620 parts of chlorobenzene, and then 36.5 parts of hydrogen chloride were injected. The resulting warm (about 50°C) thickly liquid suspension of the 3,4-dichloroaniline hydrochloride was heated within 30 minutes to 70°C and maintained at this temperature for 2½ hours. During the whole time a total of 300 parts of phosgene was injected into the suspension which was becoming progressively thinner. Finally, a clear solution was obtained which was rapidly heated to refluxing and refluxed for 1 hour. After having expelled the solvent under 50 mm Hg pressure, 3,4-dichlorophenylisocyanate passed over at 97° to 98°C under 5 mm Hg as a colorless liquid which on cooling crystallized. The yield amounted to 177 parts = 94.3 percent of theory.

When the reaction was carried out without adding the oxethylate, the phosgenation proceeded much more slowly. After the used phosgenation time of 3 hours the reaction mixture still consisted of a thickly liquid suspension and the yield amounted to only 41.5 percent.

EXAMPLE 7

A mixture of 255.1 parts of 4-chloroaniline, 1276 parts of chlorobenzene and 3.1 parts of nonylphenol polyethylene oxide (containing 14 ethylene oxide units) was run without further cooling, through an immersion tube, within 1 hour into a solution, cooled to about 5°C, of 400 parts of phosgene in 1276 parts of chlorobenzene. Hot phosgenation and working up were carried out as described in Example 1, except that a phosgenation time of 30 minutes at 70°C was used.

Yield: 303.5 parts of 4-chlorophenylisocyanate (= 98.9 percent of theory). When the addition of nonylphenol polyethylene oxide was omitted, there were obtained after 30 minutes at 70°C 290.5 parts (= 94.7% of theory) and after 120 minutes at 70°C 297 parts of 4-chlorophenylisocyanate (= 96.7% of theory).

EXAMPLE 8

A solution of 161 parts of 3-trifluoromethylaniline and 1.6 parts of polyethylene oxide (average molecular weight 20,000) in 800 parts of chlorobenzene was dropped within 1 hour under the surface of a solution of 200 parts of phosgene in 800 parts of chlorobenzene. The suspension of carbamic acid chloride and hydrochloride was rapidly heated to 50°C and then within 1 hour to 70°C; during this hour 50 parts of phosgene were injected into the suspension which was becoming ever thinner. Finally, the almost clear solution was heated within 1 hour to the reflux temperature and kept refluxing for 1 hour.

The yield of 3-trifluoromethyl-phenylisocyanate amounted to 96.1 percent of theory.

When the phosgenation was carried out without the addition of polyethylene oxide, there resulted after hot phosgenation between 50° and 70°C a moderately thick suspension which frothed so much that it took very long (about 2 hours) to heat it to the reflux temperature. The yield of 3-trifluoromethyl-phenylisocyanate corresponded to 93.6 percent of the theoretical.

EXAMPLE 9

244.4 Parts of molten 2,4-diaminotoluene were mixed at 100°C under nitrogen with 244 parts of ortho-dichlorobenzene. The solution, which had a temperature of 90°C, was run within 2 minutes into 244 parts of ortho-dichlorobenzene cooled at −10°C with vigorous stirring and cooling. After a temporary rise of the temperature to a maximum of 30°C, the suspension was cooled to 0°C. The amine suspension, which at that point still flowed well, was stirred under nitrogen within 2 minutes into a mixture, cooled at 0°C, of 600 parts of ortho-dichlorobenzene and 800 parts of phosgene. Then 4.9 parts of nonylphenol polyethylene oxide (containing 14 ethylene oxide units) were added, and the thinly liquid suspension was slowly heated to 25°C (within 2 hours) while stirring it.

Then, while injecting 2 parts of phosgene per minute, the batch was heated to a high temperature as follows: For 3 hours at 25° to 90°C; for 1 hour at 90°C; for ½ hour at 90° to 150°C, and for 2½ hours at 150°C. Finally, the phosgene was displaced by injecting nitrogen at 170°C.

After distillation, there were obtained 293 parts (= 84% of theory) of 2,4-toluylenediisocyanate. When no nonylphenol ethylene oxide was added, the yield amounted only to 254 parts corresponding to 73 percent of the theoretical.

EXAMPLE 10

A mixture of 350 parts of 3-nitroaniline, 1750 parts of chlorobenzene and 9 parts of nonylphenol polyethylene oxide (containing 30 ethylene oxide units) was mixed within 1 hour with a solution of 500 parts of phosgene and 1750 parts of chlorobenzene, while cooling the reaction mixture to keep it at a temperature of 20°C.

The thin suspension was then heated within 30 minutes to 65°C and maintained at this temperature for 2 hours, during which phosgene was injected at a rate of 0.8 part per minute. The solution, which had become almost clear at 65°C, was then raised within ½ to 1 hour to the reflux temperature to expel the hydrogen chloride and phosgene and decompose the carbamic acid chloride and kept refluxing for 30 minutes.

Total analysis of the clear reaction solution revealed 404 parts of the corresponding isocyanate (= 98.0 percent of theory) of which 395 parts were isolated by distillation in the form of the 100 percent isocyanate (= 96.0 percent of theory).

When no nonylphenol polyethylene oxide was added, all other conditions being the same, only 250 parts of isocyanate (= 61 percent of theory) were obtained (titrated) from which by distillation 190 parts could be isolated in the form of 100 percent isocyanate (= 46 percent of theory). In addition, the cold phosgenation suspension was substantially more viscid and more difficult to stir so that the heat dissipation took longer.

EXAMPLE 11

A solution, heated to 70°C, of 219.5 parts of 4-amino-4'-chlorodiphenyl ether in 700 parts of chlorobenzene was dropped within 30 minutes into a solution of 200 parts of phosgene in 400 parts of chlorobenzene, while maintaining the reaction mixture at 25° to 30°C by external cooling. Then 10 parts of nonylphenol polyethylene oxide (containing 15 ethylene oxide units) were added and the whole was heated to the reflux temperature (133° to 135°C) within 1 hour without further injection of phosgene. This temperature was maintained for about 60 minutes until the solution was substantially free of phosgene and hydrogen chloride. After having distilled off the solvent, 4-isocyanate-4'-chloro-diphenyl ether passed over at 164°C under 4 to 5 mm Hg. Yield: 231 parts = 94.2 percent of the theoretical.

When the same reaction was carried out without addition of nonylphenol polyethylene oxide, the yield was only 210 parts = 85.6 percent of the theoretical.

EXAMPLE 12

A solution of 186 parts of aniline and 5 parts of nonylphenol polyethylene oxide (containing 15 ethylene oxide units) in 930 parts of chlorobenzene was dropped within 30 minutes at about 20°C into a solution of 400 parts of phosgene in 930 parts of chlorobenzene. The batch was then heated to 70°C, at this temperature 87 parts of phosgene were injected within 52 minutes, and the whole was then heated to the reflux temperature (133°C) and thus maintained for 30 to 60 minutes. Yield of phenylisocyanate: 96.5 percent of theory.

When the same reaction was carried out without adding nonylphenol polyethylene oxide, the yield was only 95.1 percent of the theoretical.

We claim:

1. In a process for the preparation of an isocyanate of the benzene series by reacting phosgene with the corresponding primary amine or its salts in an inert solvent the improvement comprising carrying out the reaction in the presence of about 0.1 to 10 percent by weight, based on the amount of primary amine or amine salt, of a catalyst consisting of a reaction product of ethylene oxide with a compound selected from the group consisting of water; saturated or mono-olefinically unsaturated straight-chain or branched aliphatic mono- to hexadydric alcohol of up to 18 carbon atoms; mono- to hexahydric cyclohexyl alcohol; mono- to trihydric phenol which is unsubstituted or substituted by 1 to 3 identical or different radicals selected from the group consisting of alkyl or 1 to 10 carbon atoms, chlorine and lower alkoxy; ammonia; and primary or secondary saturated or mono-olefinically unsaturated straight-chain or branched aliphatic amine of up to 18 carbon atoms in each aliphatic group; said reaction product contains at least 6 ethylene oxide units in each polyethylene oxide group and at least one free terminal hydroxy group.

2. A process as claimed in claim 1, wherein the primary amine which is reacted with phosgene has the formula

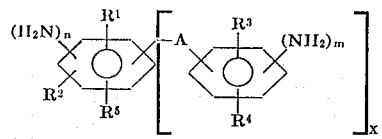

in which $R^1$, $R^2$, $R^3$ and $R^4$ are hydrogen, lower alkyl, lower alkoxy, trifluoromethyl or nitro, $R^5$ is hydrogen, chlorine or methyl, A is a direct bond, oxygen or methylene, $n$ is 1 or 2 $m$ is zero or 1 and $x$ is zero, 1 or 2.

3. A process as claimed in claim 1, wherein the primary amine which is reacted with phosgene has the formula

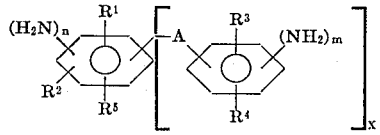

in which $R^1$, $R^2$, $R^3$ and $R^4$ are hydrogen, chlorine, bromine, methyl, methoxy, trifluoromethyl or notro, A is a direct bond, oxygen or methylene, $n$ is 1 or 2, $m$ is zero or 1 and $x$ is zero or 1.

4. A process as claimed in claim 1, wherein the primary amine which is reacted with phosgene has the formula

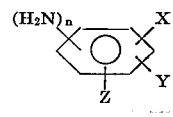

in which X is hydrogen, chlorine, methyl, trifluoromethyl, nitro or chlorophenoxy, Y is hydrogen or chlorine and Z is hydrogen, chlorine or methyl, and $n$ is 1 or 2.

5. A process as claimed in claim 1, wherein the primary amine which is reacted with phosgene has the formula

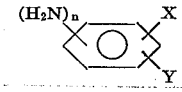

in which X is hydrogen, chlorine, methyl, trifluoromethyl, nitro or chlorophenoxy, Y is hydrogen or chlorine and $n$ is 1 or 2.

6. A process as claimed in claim 1, wherein the catalyst is an oxethylate of water; of a mono- to tetrahydric saturated or mono-olefinically unsaturated straight-chain or branched aliphatic alcohol of up to 18 carbon atoms; a mono- or di-hydric cyclohexyl alcohol; a monohydric phenol which is unsubstituted or substituted by 1 to 3 identical or different radicals selected from the group consisting of alkyl of 1 to 10 carbon atoms and lower alkoxy; ammonia or; a primary or secondary saturated or mono-olefinically unsaturated straight-chain or branched aliphatic amine of up to 18 carbon atoms in each aliphatic group.

7. A process as claimed in claim 1, wherein the catalyst is an oxethylate of water; a mono- to tetrahydric saturated or mono-olefinically unsaturated straight-chain or branched aliphatic alcohol of up to 18 carbon atoms; cyclohexanol; phenol, nonylphenol, tributylphenol; or ammonia, a primary alkyl or alkenyl amine of up to 18 carbon atoms.

8. A process as claimed in claim 1, wherein the catalyst is an oxethylate of water, alkanol or alkenol of up to 18 carbon atoms, alkanediol of up to 18 carbon atoms, glycerol, pentaerythrol, nonylphenol, tributylphenol; or ammonia, primary alkyl or alkenyl amine of up to 18 carbon atoms.

9. The process as claimed in claim 1, wherein 0.5 to 5 percent by weight of said catalyst is used, based on the primary amine or amine salt which is reacted with phosgene.

10. A process as claimed in claim 1, wherein a primary mono- or diamine is reacted with phosgene.

11. The process as claimed in claim 1, wherein the inert solvent is benzene or a chlorinated benzene.

* * * * *